United States Patent [19]

Handke et al.

[11] Patent Number: 4,810,538

[45] Date of Patent: Mar. 7, 1989

[54] METHOD FOR AUTOMATIC COATING OF WORKPIECES

[75] Inventors: Heinz Handke, Gemrigheim; Hermann Rothenburger, Erligheim, both of Fed. Rep. of Germany

[73] Assignee: Behr-Industrieanlagen GmbH & Co., Ingersheim, Fed. Rep. of Germany

[21] Appl. No.: 176,422

[22] Filed: Apr. 1, 1988

[30] Foreign Application Priority Data

Apr. 2, 1987 [DE] Fed. Rep. of Germany ....... 3711020

[51] Int. Cl.$^4$ .............................................. B05D 1/02
[52] U.S. Cl. .................................... 427/424; 118/323; 118/668; 118/707
[58] Field of Search ................ 427/424, 421; 118/323, 118/668, 707

[56] References Cited

U.S. PATENT DOCUMENTS 3,286,688 11/1966 Blenman .............................. 118/323
4,448,819 5/1984 Buschor ............................... 427/424

FOREIGN PATENT DOCUMENTS

EP84523 7/1983 European Pat. Off. ............ 118/668
0218000 1/1985 U.S.S.R. ............................... 118/323

*Primary Examiner*—Shrive Beck
*Assistant Examiner*—Vi Duong Daug
*Attorney, Agent, or Firm*—Reising, Ethington, Barnard, Perry & Milton

[57] ABSTRACT

In the case of sequentially coating workpieces, such as motor vehicle bodies, with a program controlled painter-robot, it has hitherto been difficult or impossible to finish painting a partly coated workpiece in the event of an unscheduled breakdown. This was because the robot and the workpiece would inertially overrun their synchronized relative positions after the breakdown, thus making it difficult to resynchronize the two. According to the subject invention, based upon the synchronized relative positions of the workpiece and the painter-robot both at the time of the breakdown and after the unit has come to stop, a path of travel is determined over which the robot is returned accurately to the relative position at which the breakdown occurred. The coating operation is then resumed from this position.

6 Claims, No Drawings

METHOD FOR AUTOMATIC COATING OF WORKPIECES

TECHNICAL FIELD

The subject invention relates to a method for automatically coating workpieces moved along by a conveying device and coated by a moveable spraying device.

BACKGROUND ART

Workpieces to be coated sequentially, for example the unprocessed bodies of motor-vehicles, are moved by either floor mounted or suspended conveying devices through a spraying booth containing a painter-robot, or like spraying device, controlled by a computer having a stored processing and motion program. As is known, the motion program may be set up by a "teach-in" method involving the determination of a plurality of paint-impact points, or locations, on the workpiece body which the painter-robot passes consecutively when the coating unit is in operation. It is desirable for the coating process to be carried out as the workpiece body moves continuously through the spraying booth. Thus, the spraying device of the robot moves not only relative to the workpiece but also in parallel with the movement of the conveying device.

In coating processes of this kind, there is a possibility of being interrupted automatically or manually, for example in the event of a power-failure, in an emergency, or for some other reason, whereupon the robot-painter and the conveying device are halted. In such an event it has hitherto been impossible to resume the coating process by carrying on with the program, since both the conveying device and the painter-robot come to a halt in non-specific terminal positions because of their inertia. Therefore, the resulting new relative positions between the spraying device and the workpiece body are no longer specifically related to the interrupted program, i.e., they are no longer synhronized.

Even if the spraying device were to be moved manually back to the approximate relative position where the coating process was interrupted, automatic continuation of the coating process would still be impossible since the last specific paint-impact point on the workpiece body reached by the program control is unknown. For these reasons, partly coated workpiece bodies have hitherto not been finished but have been removed as rejects. Further, a coating process interruption affects not only one, but several workpiece bodies being coated simultaneously, and thus renders them all rejects.

SUMMARY OF THE INVENTION AND ADVANTAGES

The subject invention provides a method for automatically coating workpieces using a movable spraying device while the workpieces are moved along a conveying device. The spraying device and conveying device are of the type being susceptible to movement interruptions in the event of a power failure. The subject method includes the steps of synchronizing movements of the spraying device and the conveying device using a stored processing program. The subject method is characterized by storing the positions of the spraying device and the conveying device at the moment of a movement interruption, storing the positions of the spraying device and the conveying device after movement has ended, repositioning the spraying device relative to the conveying device to the relative synchronized position based upon the stored positions, and resuming the automatic workpiece coating processing program.

The subject invention provides a method of coating workpieces which will make it possible, in the event of unscheduled interruptions, to resume the interrupted processing-program at the point of interruption, i.e. to finish coating the partly coated workpieces automatically.

DETAILED DESCRIPTION OF THE PREFERRED EMBODIMENT

The invention is explained hereinafter in conjunction with an example of the coating of a motor vehicle body with a painter-robot. In this case the bodies to be coated are moved continuously through a spraying booth upon a conventional conveyor. The location of the workpiece body along the conveyor-track is determined continuously by a so-called tape-emitter. The tape-emitter, in the form of a synchro-resolver or the like, produces pulses, e.g., 10 pulses per mm, by which simultaneous movement of the painter-robot upon a "7th axis" along the conveyor-track is synchronized and controlled. That is, starting from a reference position, e.g., a zero position, the travel of the workpiece body relative to the conveyor-track is measured in appropriate units by the tape-emitter so that the painter-robot can be correspondingly synchronized and controlled. Additional position-emitters are used to report the overall movement of the painter-robot about its other 6 axes.

In the event of an unscheduled shut-down of the unit, resulting from either automatic or inadvertent actuation of an emergency-switch or some other power switch, the spraying process is interrupted almost immediately. Both the conveyor, and thus the workpiece body, and the painter-robot moving along the conveyor-track are immediately braked but continue to move because of their inertia until they stop at some not accurately pre-determinable position. The inertial overrun of the conveyor and the painter-robot usually differ from each other. Any parts of the painter-robot, for instance the spraying device, which are in motion when the unit is shut-down will continue to move about the corresponding axes until coming to a halt in random positions.

However, the final locations of the conveyor and of the painter-robot are each reported by the above-mentioned tape-emitter and the robot-position-emitter and stored in the form of electrical signals. Additionally, the position reached at the moment when the unit was switched off is stored. The stored signals are then fed to a computer which calculates a travel-path, taking into account the control-data from the processing-program, over which travel-path the painter-robot can be moved to the position, relative to the body, which the painter-robot occupied when the unit was shut-down. However, this relative position is not usually a suitable position to resume spraying at since it is not one of the workpiece body paint-impact points provided in the processing program, as defined when the painter-robot is programmed by the usual teach-in method. However, the control-system knows the specific paint-impact points located in the program-sequence before and after the point of interruption, therefore the painter-robot is moved to one of these two points If it is better to coat individual parts of the body workpiece body with too little paint rather than twice the amount, it is desirable for the coating process to be resumed at the second of these two points, i.e., the paint-impact point after the interruption.

This resumption of the programmed coating operation may be initiated by the operating crew by manual actuation of a restart-switch or the like after the cause of the emergency shut-down has been eliminated. Under certain circumstances, however, the arm of the painter-robot carrying the spraying device may have moved during the inertial overrun to a terminal position from which it cannot be moved back to the original relative position without contacting the workpiece body. In this case, the painter-robot is first moved to a more favorable intermediate position. The preliminary motion information corresponding to the favorable intermediate position is fed automatically to the control computer, which then coordinates the resumed movement of the workpiece body to the original relative synchronized position with respect to the spraying device.

If use is made of a spraying device adapted to move in parallel with the conveyor track, after the interruption it is better to move the spraying device relatively to the workpiece, along the conveyor-track, instead of moving the conveyor back to where it was when the interruption took place. In other cases, especially in the case of a stationary spraying device, however, the conveyor, and thus the workpiece, may be moved back to a synchronized position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method for automatically coating workpieces using a moveable spraying device while the workpieces are moved along a conveying device, the spraying device and conveying device of the type being susceptible to movement interruptions in the event of power supply failure; said method including the steps of synchronizing the movements of the spraying device and the conveying device using a stored processing program; and characterized by storing the positions of the spraying device and the conveying device at the moment of a movement interruption; storing the positions of the spraying device and the conveying device after movement of the spraying device and conveying device has ended; repositioning the spraying device relative to the conveying device to the relative synchronized position based upon the stored positions; and resuming the automatic workpiece coating processing program.

2. A method as set forth in claim 1 further characterized by moving the spraying device in a path along the line of movement of the conveying device after the movement interruption to reach the synchronized position in relation to the workpiece.

3. A method as set forth in either of claims 1 or 2 further characterized by establishing the terminal position of the conveying device with a tape-emitter.

4. A method as set forth in claim 1 further characterized by manually moving the spraying device after the movement interruption to an intermediate position, and then automatically moving the spraying device into a predetermined synchronized position in relation to the workpiece.

5. A method as set forth in claim 1 further characterized by the processing-program containing control-data for coating a plurality of individually defined paint-impact points on the workpiece which are passed by the spraying device in sequence during the execution of the processing program, and moving the spraying device to the last paint-impact point before the interruption after the movement interruption.

6. A method as set forth in claim 1 further characterized by the processing program containing control data for coating a plurality of individually defined paint-impact points on the workpiece which are passed by the spraying device in sequence during the execution of the processing program, and resuming the coating operation of the first paint-impact point provided after the position of the spraying device and the conveying device at the moment of the movement interruption, according to the programmed coating sequence.

* * * * *